(12) United States Patent
Alakarhu

(10) Patent No.: US 8,035,689 B2
(45) Date of Patent: Oct. 11, 2011

(54) CAMERA UNIT AND METHOD FOR CONTROLLING AN IMAGE SENSOR IN A CAMERA UNIT

(75) Inventor: Juha Alakarhu, Tampere (FI)

(73) Assignee: Nokia Corporation, Espoo (FI)

( * ) Notice: Subject to any disclaimer, the term of this patent is extended or adjusted under 35 U.S.C. 154(b) by 334 days.

(21) Appl. No.: 12/086,160

(22) PCT Filed: Dec. 7, 2005

(86) PCT No.: PCT/FI2005/050448
§ 371 (c)(1),
(2), (4) Date: Mar. 30, 2009

(87) PCT Pub. No.: WO2007/065964
PCT Pub. Date: Jun. 14, 2007

(65) Prior Publication Data
US 2009/0251584 A1    Oct. 8, 2009

(51) Int. Cl.
*H04N 5/225* (2006.01)
*H04N 5/222* (2006.01)

(52) U.S. Cl. .............. 348/207.11; 348/333.01

(58) Field of Classification Search .......... 348/207.11, 348/370, 371
See application file for complete search history.

(56) References Cited

U.S. PATENT DOCUMENTS

| | | | |
|---|---|---|---|
| 6,493,030 B1 | 12/2002 | Kozlowski et al. | |
| 7,428,378 B1 * | 9/2008 | Warpakowski Furlan | 396/157 |
| 2001/0043279 A1 * | 11/2001 | Niikawa et al. | 348/335 |
| 2003/0206235 A1 | 11/2003 | Suzuki | |
| 2004/0056975 A1 * | 3/2004 | Hata | 348/371 |
| 2004/0212723 A1 | 10/2004 | Lin | |
| 2005/0057680 A1 | 3/2005 | Agan | |
| 2005/0179782 A1 * | 8/2005 | Endo | 348/207.99 |
| 2006/0044460 A1 * | 3/2006 | Lee et al. | 348/371 |

FOREIGN PATENT DOCUMENTS

| | | |
|---|---|---|
| EP | 1416713 | 5/2004 |
| EP | 1578118 | 9/2005 |
| JP | 6294987 | 10/1994 |
| JP | 2001292371 | 10/2001 |

(Continued)

OTHER PUBLICATIONS

Micron Technology, "½-Inch 3-Megapixel CMOS Digital Image Sensor", Jul. 31, 2005.

(Continued)

*Primary Examiner* — Sinh Tran
*Assistant Examiner* — Christopher K Peterson
(74) *Attorney, Agent, or Firm* — Hollingsworth & Funk, LLC

(57) ABSTRACT

The invention relates to a camera unit, comprising an image sensor (10), a mechanical shutter (16), a host module (12), and connections between them, in particular a data and control connection (D1, C1) between the image sensor and the host unit. In the image sensor (10), there is a photoelectric pixel matrix (101), a timing unit controlling it, an electronic shutter (ERS), and a 'global reset' circuit for resetting the pixels simultaneously. The said data and control connection comprises: a data connection (D1) based on a series bus, a control connection (C1) based on a series bus, and a global-reset signal connection (G1, G2) separate from these. The invention also relates to a method for controlling an image sensor in a camera unit.

8 Claims, 6 Drawing Sheets

FOREIGN PATENT DOCUMENTS

JP          2005303673          10/2005

OTHER PUBLICATIONS

Office Action of parallel European application No. 05817665.2 dated Jan. 7, 2010.

Philips Semiconductors, "The I$^2$C-Bus Specification", Version 2.1, Jan. 2000, pp. 1-46, http://www.semiconductors.philips.com/acrobat_down load/literature/9398/39340011.pdf.

Office Action with translation dated Sep. 29, 2010 from JP Application No. 2008-543856, 13 pages.

* cited by examiner

CAMERA UNIT AND METHOD FOR CONTROLLING AN IMAGE SENSOR IN A CAMERA UNIT

FIELD OF THE INVENTION

The present invention relates to a camera unit and to a method for controlling an image sensor in the camera unit.

BACKGROUND OF THE INVENTION

In camera units, either an electrical or a mechanical shutter can be used. If a mechanical shutter is used, precise synchronization is required between the global reset of the image sensor and the mechanical shutter. This global reset resets all the pixels (charge values) simultaneously, when the exposure of the image begins. Image exposure ends by closing the mechanical shutter. Typically a timing unit connected to the camera sensor controls all the imaging functions.

In digital still cameras and also in some palm computers, a mechanical shutter is used. The traditional connection of an image sensor to the host system is a parallel bus while synchronized imaging is used to connect HSYNC, VSYNC signals to the parallel bus. In addition, the global-reset command is conventionally implemented by means of two external signals.

Application US 2005/0057680 (Agan) discloses a method and device for controlling the imaging time in an image sensor. A row decoder and column controller controlled by the timing unit are connected to a CMOS cell. The difference between the start and end-state charge of the pixels is transferred to an ADC converter, from where it is transferred in a digital form to an image compressor. In this case, the image sensor is connected to a common bus (FIG. 7). All the other computer components, i.e. CPU, RAM, hard disk, I/O device, and CD-ROM drive are connected to the same bus too. This means that the connection of the image sensor contains as many as tens of signal leads, which clearly interferes with the miniaturization of the device.

Image sensors and their internal construction and control circuits are described in the manufacturers' data sheets. The Canon DIGIC II presents a CMOS sensor host module, which contains a considerable amount of image-processing functions. The image sensor is connected to this with quite a large number of leads. A 3.1 Megapixel CMOS image sensor, in which there is not only a pixel matrix, but also a timing unit controlling imaging, an ADC conversion unit, and a control register, is known under the name Micron MT9012. The circuit is equipped with I/O circuits for transmitting/receiving data, control commands, and timing data. Due to the parallel I/O of the ADC circuit, the number of signal leads becomes quite large.

Synchronization between a mechanical shutter system and an image sensor demands several I/O pins and there is often quite a long delay between the command signal and the actual exposure of the image. Generally, a considerable number of I/O pins are required between the host module and the image sensor.

SUMMARY OF THE INVENTION

The present invention is intended to eliminate the problems referred to above and create an image-sensor connection to the host module that is simpler than previously, which will permit ever smaller image-sensor modules. In addition, the invention discloses a method, which will permit an extremely rapid reaction to the pressing of the trigger by the user of the camera (shutter-delay minimization).

The use of the invention also resolves the inflexibility of some control methods, in which the image sensor has had to be selected only from those in which there is direct control of the mechanical shutter.

The characteristic features of the invention are stated in the accompanying Claims. In one embodiment of the invention, the host module is more intelligent than previously in the sense that it detects the timing used by the image sensor and acts independently to control the mechanical shutter and/or the flash.

Advantages achieved by the invention
  possibility for smaller image-sensor modules, due to the small number of the image sensor's signals.
  possibility for a short delay from the time when the user presses the imaging button to when the actual image is taken.
  flexibility in the selection of image sensor.

In the method according to the invention, the host module is responsible for the main commands of the imaging sequence. The host module initiates imaging by creating an external global reset (GRST) signal. The entire imaging sequence is synchronized with this signal. The host module knows the delay from the GRST to the start of imaging and from the GRST to the start of image reading. In this way the host module can trigger the flash and close the mechanical shutter at the correct moment. The invention also discloses another corresponding way, in which the host module commences the sequence by transmitting an I2C (or other) signal to the sensor and the sensor responds with a signal with which the entire imaging procedure is synchronized. (In that case, the shutter delay will not, of course, be optimally short, though the other advantages of the invention will be achieved.)

The host module is, for example, a camera processor or the baseband unit of a mobile station.

In one embodiment, once the GRST signal has been created, the image sensor immediately stops the current electronic rolling-shutter frame and goes to the global reset mode. In this way, the delay from the pressing of the button by the user to the actual start of the imaging is as short as possible. The use of this method also has an advantage in applications using the I2C series bus, as generally I2C commands cannot be precisely timed.

DESCRIPTION OF THE DRAWINGS

In the following, the invention is examined with the aid of examples and with reference to the accompanying drawings.

DETAILED DESCRIPTION OF THE INVENTION

Figure 1:
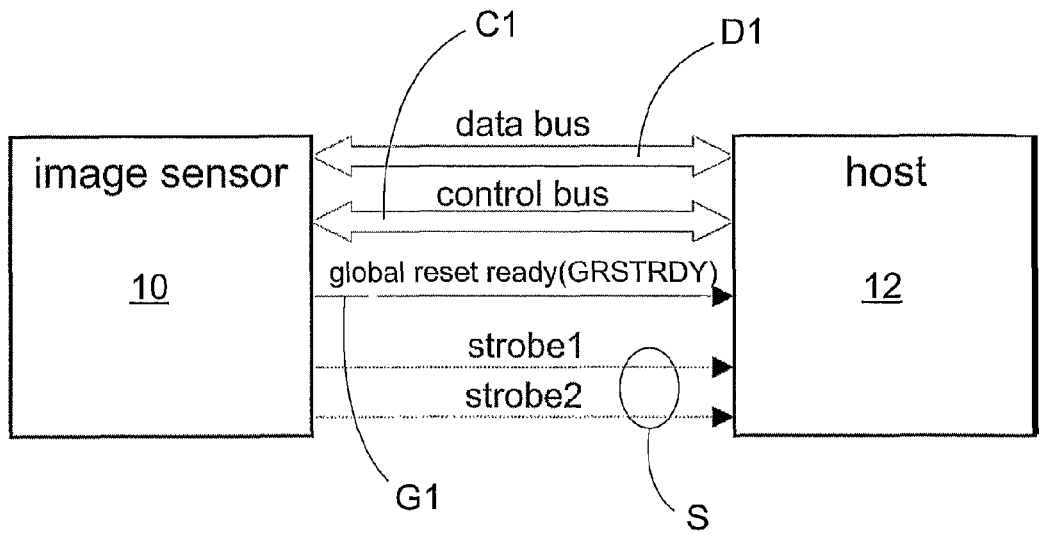
FIG. 1 shows a block diagram of the connection between the image sensor and the host module (Mode A).
Figure 2:
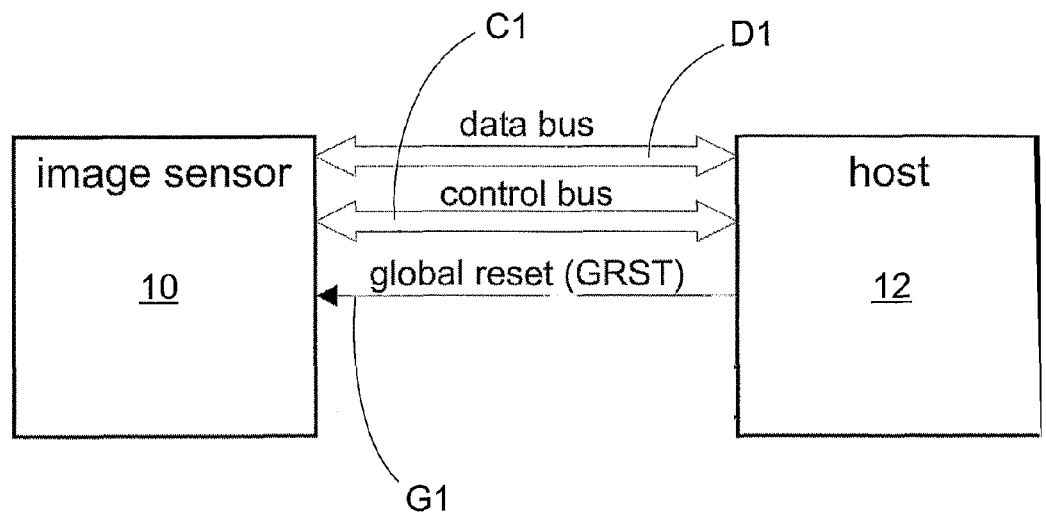
FIG. 2 shows a second block diagram of the connection between the image sensor and the host module (Mode B).
Figure 6:
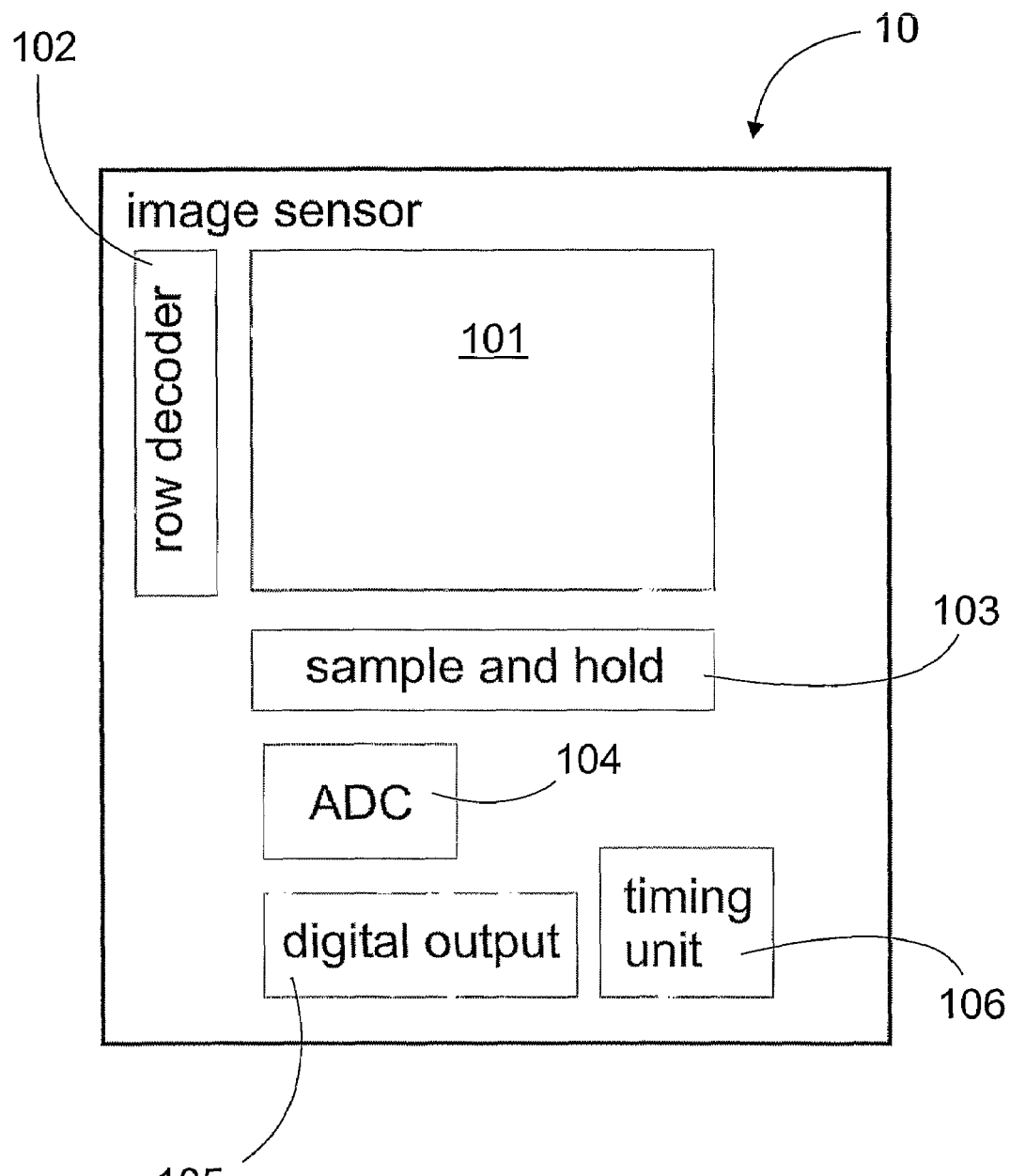
FIG. 6 shows the internal construction of the camera unit.

In FIGS. 1 and 2, the internal construction of the image sensor is at least mainly according to FIG. 6. In the image sensor 10, there is not only a pixel matrix 101, but also first of all a row decoder 102 and a sample/hold-read circuit 103, from where the analog charge-state values are lead through an ADC converter 104 to a digital output unit 105. A timing unit 106 controls the operation of the above blocks.

According to FIG. 1 (Mode A), the image sensor 10 is connected to the host module 12 by means of a data bus D1, a control bus C1, a global-reset signal lead G1, and a strobe-signal lead S. In addition to this, the connection comprises one or more voltage supplies and a ground lead. Because the data bus D1 and the control bus C1 are physically series buses, a relative small number of connector leads are required to control the image sensor, thus making the image-sensor module small in size. The imaging procedure is initiated using a GRST signal. At least one image-sensor time delay is stored in the host module, according to which the host module control the imaging procedure independently without receiving control signals from the image sensor. The control bus need not be two-way—even a one-way control bus will be sufficient in terms of the present invention. A control bus according to the standard generally cannot be used for timing, because the processor will not ensure the timing of the commands. This makes a separate timing-signal connection necessary.

The strobe signals are general-purpose and optional in terms of the present invention. They can be used to control either a mechanical shutter or flash, if desired. Possible configurations would be:
A) strobe 1 for the mechanical shutter and strobe 2 for the flash;
B) strobe 1 for the preflash and strobe 2 for the actual flash;
C) strobe 1 for the mechanical shutter and strobe 2 unused, in which case the control of the flash would take place entirely from the host module;
D) strobe 1 for the flash and strobe unused, in which case the control of the mechanical shutter would take place entirely in the host module.

The operation of the strobe signals is timed in the timing unit 106 of the image sensor 10 and, in the embodiments of FIGS. 1 and 2, it is connected to the host module 12. The flash is controlled by the host module (not shown). Similarly, the host can also control the mechanical shutter, in which case the strobe signal leads will be entirely eliminated.

In the variation of FIG. 2 (Mode B) the signal lead G2 depicting the 'global-reset' function runs in the opposite direction, so that the imaging procedure will start slightly differently, which difference will become apparent later with the aid of FIGS. 7 and 8.

In this embodiment (FIG. 2), strobe signals are not used at all, so that mechanical shutter and possible flash are controlled by the host module independently with the aid of simulated timing. The connector pins and thus the number of signal leads are at a minimum.

Figure 3:
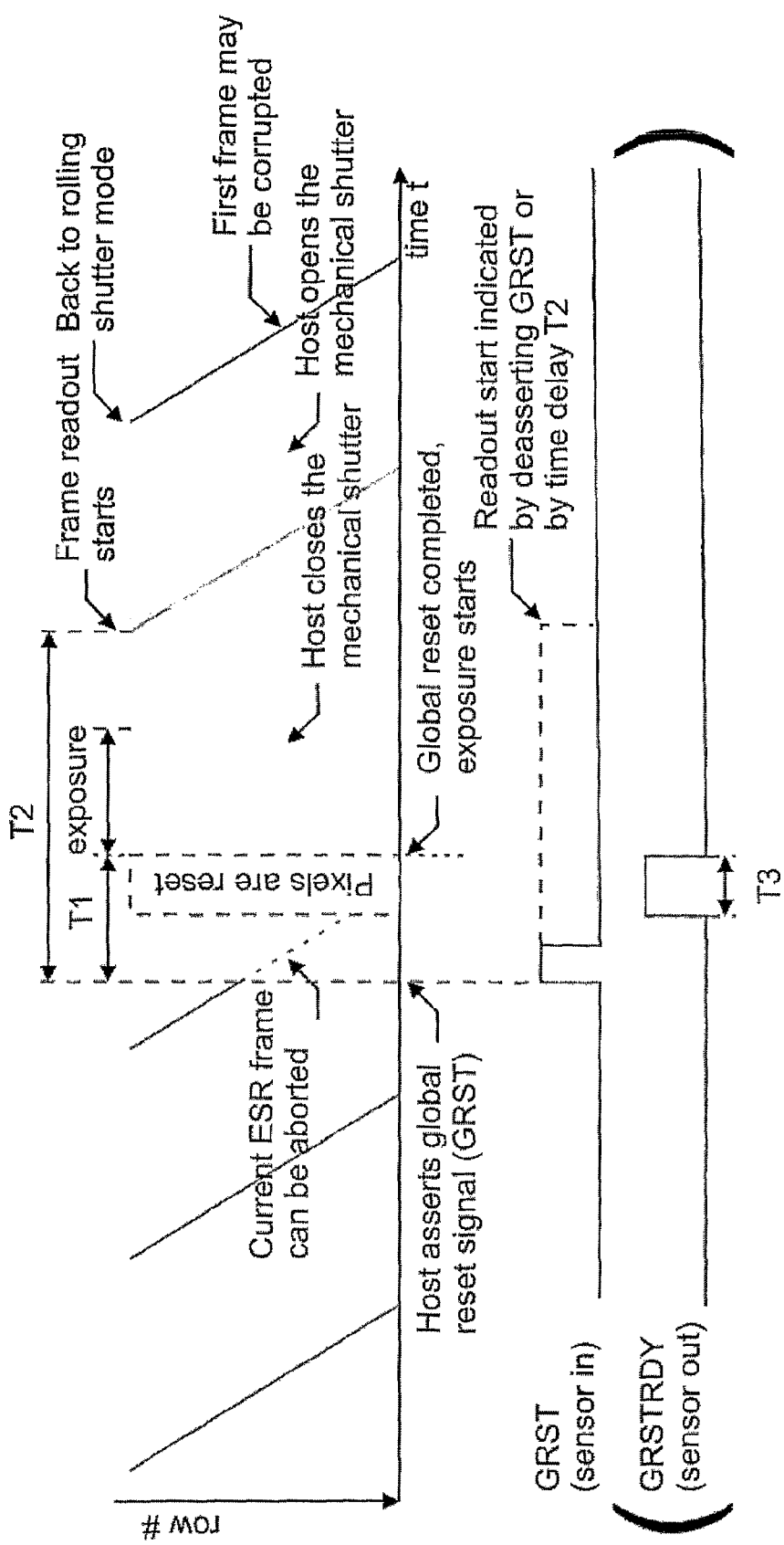
FIG. 3 shows the principle of the timing of imaging.

FIG. 3 shows the principle of the timing of imaging in mode B. The upper part of the figure shows the operation of the electronic shutter (ERS), by means of which it reads and sets the charge state to zero by row. Normally, viewfinder images are formed at intervals, by means of which, for example, the VGA resolution is obtained from a three-megapixel matrix, with the aid of scaling of the image that takes place in the binning-mode or other sensor. In the viewfinder images, the exposure time for the different rows takes place at slightly different times. The horizontal distance between the two slanting lines at each height depicts the different exposure time for different rows of the matrix.

In this case, the global-reset signal (GRST, rising edge of the pulse) is given directly from the host module, so that it may coincide with an image (frame) being transmitted. All the imaging timings are based on this moment. Thus resetting takes place entirely during the time constant T1. (I.e., in the figure T1=tRDY). When calculating the exposure time, it can be envisaged that all the pixels will be set to zero precisely at the end of tRDY). After this comes the real exposure of the image, until the host module commands the mechanical shutter to close. The reading of the image starts after the time T2 (i.e., tROUT in the figure), using the ERS-function reading procedure. The host module opens the mechanical shutter after all the rows have been read. The time of closing the mechanical shutter is shown as the grey area in the figure.

The main rules for the global reset operation (B mode) are:
Global reset is performed using only a single external signal.
This external signal is the input of the image sensor, and it initiates the global-reset function. The host module synchronizes the timing of the shutter and flash with this signal.
There must not be timing relating to the global-reset function in the critical commands of the control bus (I2C).

In the A mode, the operation differs slightly from this. The host module initiates the procedure through the command bus, but the image sensor itself times the global-reset signal between the transmission of the image frames. In this case too, all the operations are timed from the global-reset signal, but the image sensor sends the timing information to the host using a separate 'Global reset ready' (GRSTRDY) signal, to which the host independently times at least some operation relating to the imaging procedure. Such operations are, for example, the control of the mechanical shutter and flash.

Detailed Operation (B Mode)

Initiation of the global-reset sequence.

Raising the global-reset input pin (GRST) of the image sensor initiates the global-reset sequence. This terminates the current frame using the electronic rolling shutter function (ERS). The global-reset function is synchronized with the signal of the global-reset input pin.

Indication to the Host Module of Image Exposure

The delay (T1) from the assertion of the GRST to the starting of exposure of all the rows is the same, irrespective of the moment in time when the GRST was asserted. This delay T1 can be either a programmable parameter or a parameter defined by the manufacturer of the image sensor, but the host module must know this delay T1. Generally, this must be as short as possible, to be able to minimize the time between the user pressing the button and the actual capture of the image.

Optionally, the image sensor may also indicate the start of the imaging with an extra pin signal (GRSTRDY). The rising edge of this signal indicates the start of imaging after the time T3. The lowering edge indicates that all the rows of the matrix are beginning to be exposed. This delay T3 is either a parameter defined by the manufacturer, or a programmable parameter.

Even if the optional GRSTRDY signal is implemented, the mechanical shutter must be able to be synchronized with the GRST signal, i.e. the image sensor must be able to operate without the GRSTRDY signal. In other words, the host module includes means for simulating the timing of the image sensor, with the aid of which the host module is able to independently control selected devices.

Starting Image Reading

The host module closes the mechanical shutter before the reading starts. The start of the reading of the image is synchronized with the GRST signal. This has two alternatives:
the delay from the assertion of the GRST signal to the start of the reading is T2, which is a programmable parameter.

the image reading is started once the GRST signal has been counted down.

Start of the rolling electronic shutter mode after the global-reset operation

The image sensor starts the rolling shutter operation (ERS) automatically after the reset sequence. The first rolling image frame after the global-rest operation may be erroneous.

The A mode is described in greater detail in connection with FIG. 7.

Figure 4:
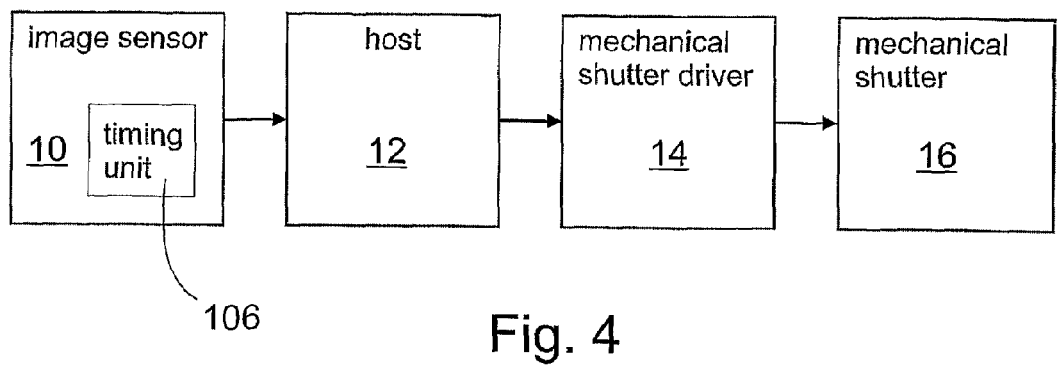
FIG. 4 shows a block diagram of one camera unit equipped with a mechanical shutter.

The overall arrangement of the camera module of FIG. 4 corresponds to the arrangement of FIGS. 1 and 2. In this case, the host module 12 controls the mechanical shutter's 16 driver 14, which controls the actual shutter.

Figure 5:
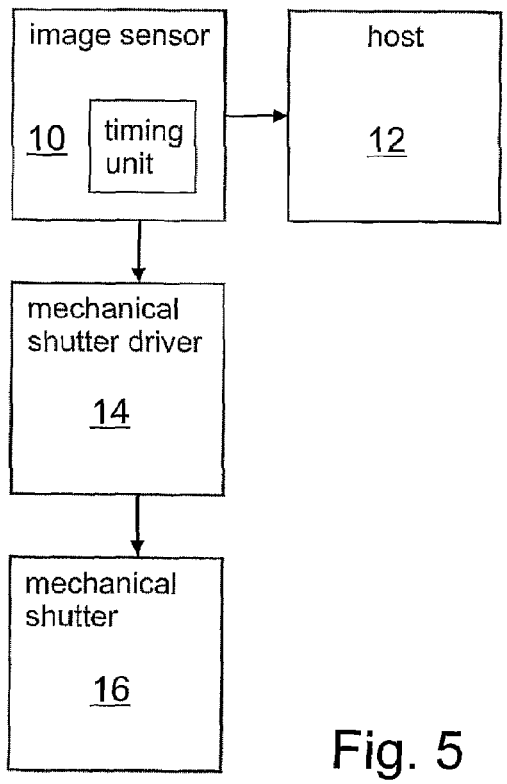
FIG. 5 shows a block diagram of a second camera unit.

In the variation of FIG. 5, the strobe signals S are connected directly to the driver 14 of the shutter 16, so that there are fewer signal leads than even between the host module 12 and the image sensor 10.

Figure 7:
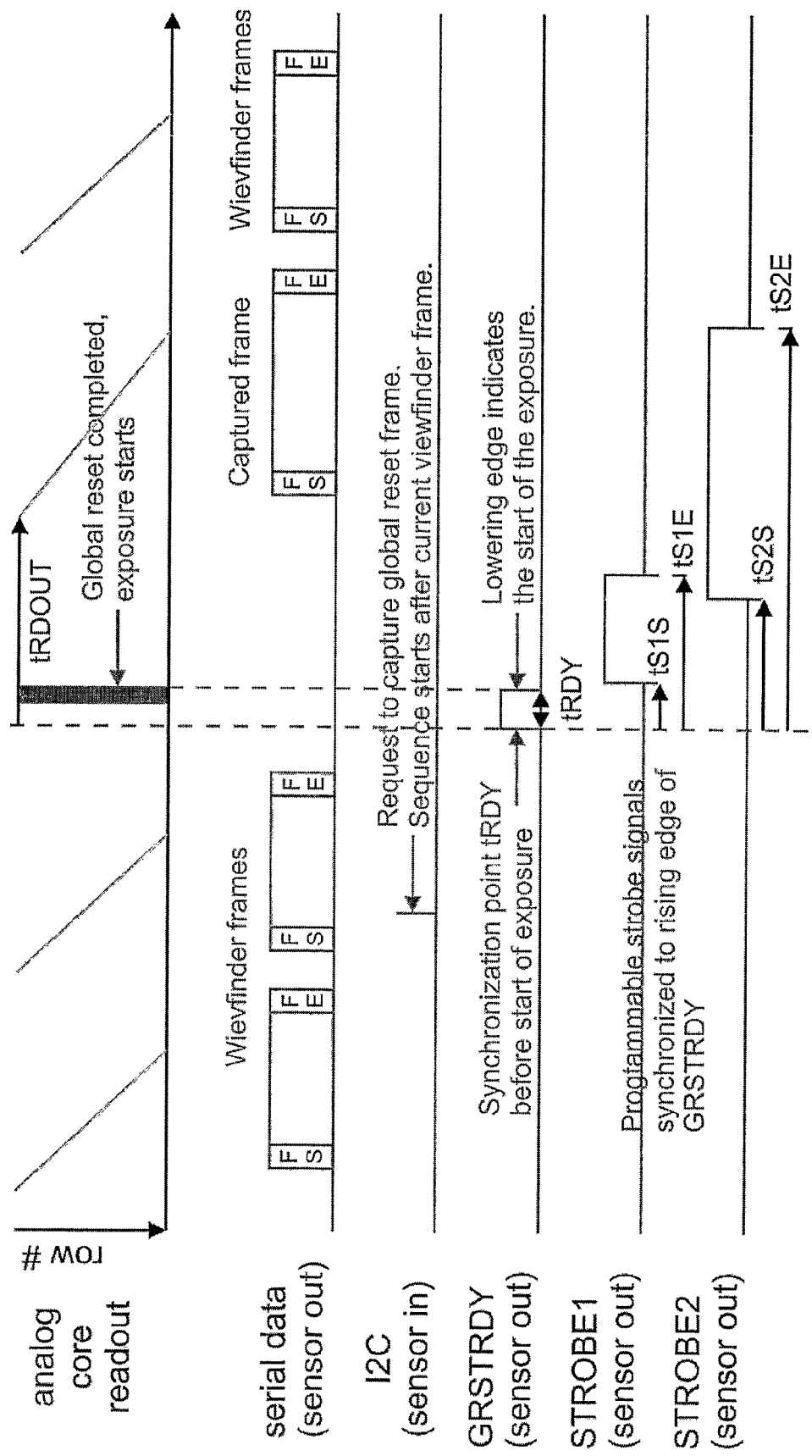
FIG. 7 shows a timing diagram relating to the block diagram of FIG. 1.

The operation of the camera module of FIG. 1 in mode A takes place according to the timing diagram of FIG. 7. The upper part of the figure shows the operation of the electronic shutter (ERS), by means of which it reads and sets the charge state to zero row by row. Normally, viewfinder images are created at intervals, which have with the aid of the binning mode, for example, VGA resolution from the three-megapixel matrix. In the viewfinder image, the various rows are exposed at slightly different times.

If it is wished to take a sharp image at a high resolution, the image sensor is commanded to such a mode and the pixels are reset simultaneously, using the global-reset signal, when exposure also starts simultaneously. The electronic rolling shutter (ERS) reads the pixels rows at different times, however, so that in order to implement even exposure a mechanical shutter is required, by means of which the effective exposure is finished simultaneously.

The second row of FIG. 7 shows the transmission of the image frames (Mode A). The desired high-resolution image appears between the intermittent viewfinder images. The third row shows the imaging request given by the control bus C1 (in this case the I2C type, a bus type developed by Philips, http://www.semiconductors.philips.com/acrobat_down load/literature/9398/39340011.pdf) from the host module 12 to the image sensor 10. The timing unit calculates the imaging parameters, which include the time constants for initiating the exposure etc. The ready signal (GRSTRDY) given to the host module 12 is the moment of starting the operations. The pulse tRDY directs the global-reset signal to its lowering edge and the time constants tS1S, tS1E, tS2S, and tS2E calculated from its rising edge.

The global reset is entirely implemented on the lowering edge of the tRDY signal. A second time definition tRDOUT expresses the maximum exposure time before the ERS starts to read and reset the pixel rows. The mechanical shutter must thus operate in this area, which more specifically depends on the required exposure, which is calculated separately in a known manner (not shown).

Figure 8:
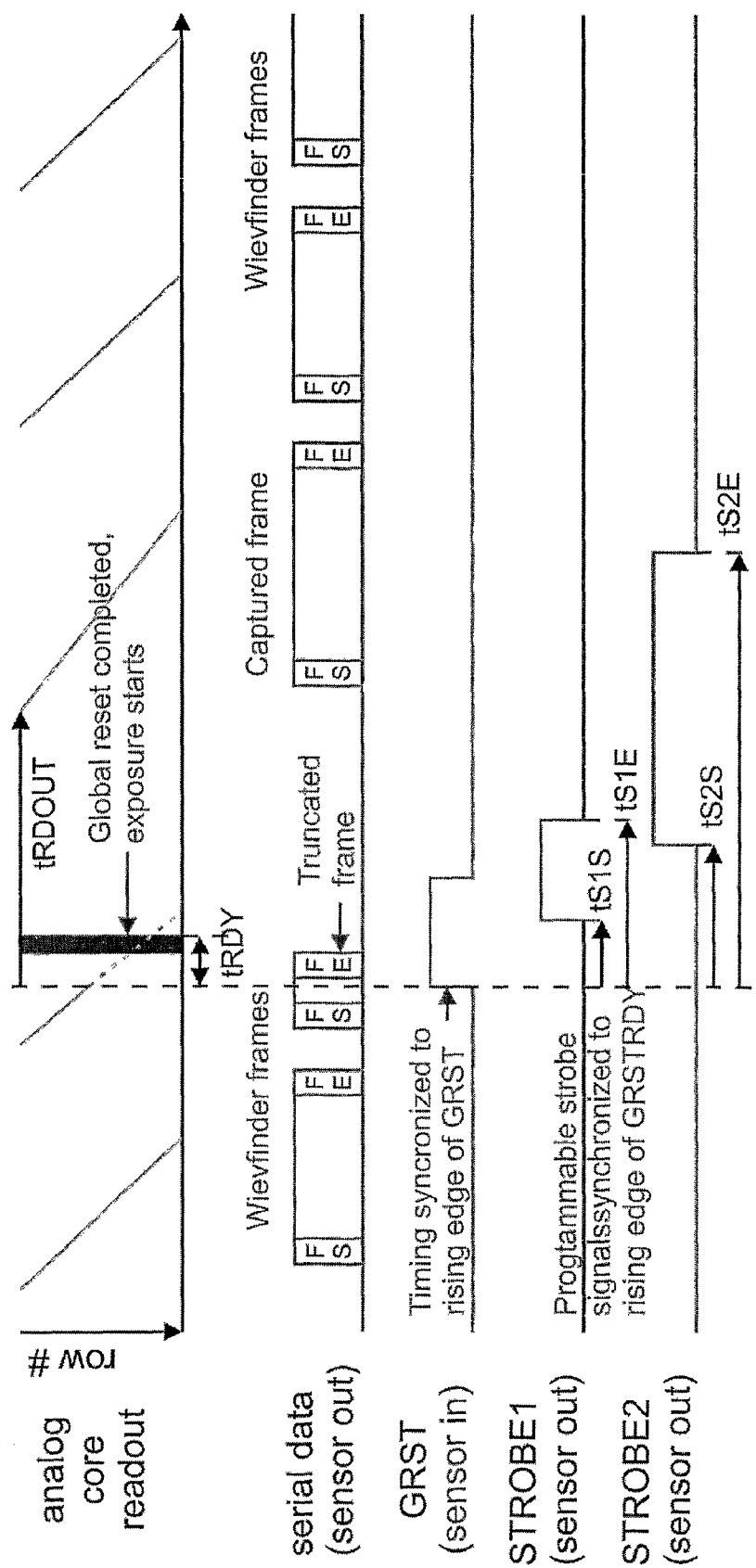
FIG. 8 shows a timing diagram relating to the block diagram of FIG. 2.

The variation of FIG. 8 (B mode) relates to the diagram of FIG. 2 and corresponds to FIG. 3. In this case, the global-reset signal (rising edge of the pulse) is given directly from the host module, so that it may coincide with an image (frame) being transmitted. In that case, resetting will take place entirely during the time constant (tRDY). It is essential, that the packet, i.e. image frame, currently being transmitted is transmitted truncated.

A variation, in which the driver of the mechanical shutter can be programmed, can be added to the embodiments above. In that case, the host programs the timing to the driver before imaging and the operation is then controlled directly using the Global reset or Global reset ready signals.

In a third variation in the case in which the host starts with the global-reset signal and not the I2C, the sensor can automatically change the mode from viewfinder to still-imaging. In addition, the still image and the viewfinder image have different parameters (such as exposure time and amplification), which are programmed into the sensor beforehand.

In one embodiment, the series bus is according to the SMIA standard (http://www.smia-forum.org). In that case the transmission of the packet is not broken immediately, but only one a number of bits divisible by 32 has been transmitted. Such an operation will permit immediate and rapid imaging without breaking the standard.

It can be generally stated that the series bus only set additional demands on the transmission protocol. For example, in the case of CCP2 (http://www.smia-forum.org), the number of bits transmitted must be divisible by 32. In the method disclosed in the present invention, none of the requirements of the series-bus protocol are broken. The invention is valid for other series buses than the CCP2 as well, for example, for MIPI's CSI-2.

The invention claimed is:

1. A camera unit, comprising:
   an image sensor including a photoelectric pixel matrix, a timing unit controlling said image sensor, an electronic shutter, and a global reset circuit for resetting the pixels simultaneously, and I/O means for transmitting image data and for receiving imaging commands,
   a mechanical shutter,
   a host module including corresponding I/O means for receiving image data and for transmitting imaging commands, and
   a data and control connection between the image sensor and the host unit, wherein said data and control connection comprises:
   a data connection based on a series bus,
   a control connection based on a series bus, and
   a global-reset signal connection separate from the data connection and the control connection, configured to transmit a timed global-reset signal from the image sensor to the host module, and
   the timing unit of the image sensor is configured, by means of a selected control command given by the host module, to initiate an imaging procedure and to create the timed global-reset signal at intervals and to send it also to the host module to indicate the start of imaging.

2. The camera unit according to claim 1, in which the image sensor is configured to create and transmit viewfinder images at intervals and the host module includes means for controlling at least one imaging procedure operation independently, based on the timed global-reset signal.

3. The camera unit according to claim 1, wherein between the image sensor and host module there are strobe-signal connections, in order to control the mechanical shutter through the host module.

4. The camera unit according to claim 3, wherein the mechanical shutter together with its driver is connected directly to the image sensor, by means of the strobe-signal connections.

5. A method comprising:
   creating viewfinder images by an image sensor of a camera unit equipped with an electronic rolling shutter at intervals at a reduced resolution;
   transmitting the viewfinder images over a data bus to a host module;

transferring to an imaging state by suspending the viewfinder operation;

initiating the imaging procedure by means of a selected control command through a control bus by the host module;

creating a timed global-reset signal at intervals;

transmitting the timed global-reset signal from the image sensor to the host module;

controlling, by the host module, a timing of at least one operation relating to the imaging procedure based on the timed global-reset signal; and resuming the creating of viewfinder images, after the image data being read by the image sensor and being transmitted over the data bus to the host module.

6. The method according to claim 5, wherein the host module controls a mechanical shutter.

7. The method according to claim 6, wherein the driver of the mechanical shutter is configured to be programmable and the host module programs the timing of the driver before imaging and operation is controlled in imaging directly by means of the timed global-reset signal.

8. The method according to claim 5, wherein the host module controls a flash.

* * * * *